United States Patent [19]
Santos

[11] 4,010,886
[45] Mar. 8, 1977

[54] MEANS AND METHODS FOR MAKING A SPIRAL MUFFLER

[75] Inventor: Gerard R. Santos, Levittown, Pa.

[73] Assignee: The Budd Company, Troy, Mich.

[22] Filed: June 23, 1975

[21] Appl. No.: 589,274

[52] U.S. Cl. .............................. 228/173; 228/182; 228/5.1; 228/15.1; 228/25; 228/32; 228/9

[51] Int. Cl.² .................... B23K 31/00; F01N 7/18

[58] Field of Search .................. 228/5.1, 9, 10, 12, 228/17, 32, 18, 27, 29, 158, 173, 235, 243, 182, 183, 15.1, 25; 431/114; 181/50, 66, 67, 71

[56] References Cited
UNITED STATES PATENTS 3,692,142  9/1972  Stemp .................. 181/66

*Primary Examiner*—Al Lawrence Smith
*Assistant Examiner*—K. J. Ramsey

[57] ABSTRACT

Apparatus for making a spiral muffler includes a mandrel for spirally winding a metal strip while maintaining a predetermined spaced relationship between the wound portions, with the strip being welded to a pair of side plates as it is wound.

8 Claims, 8 Drawing Figures

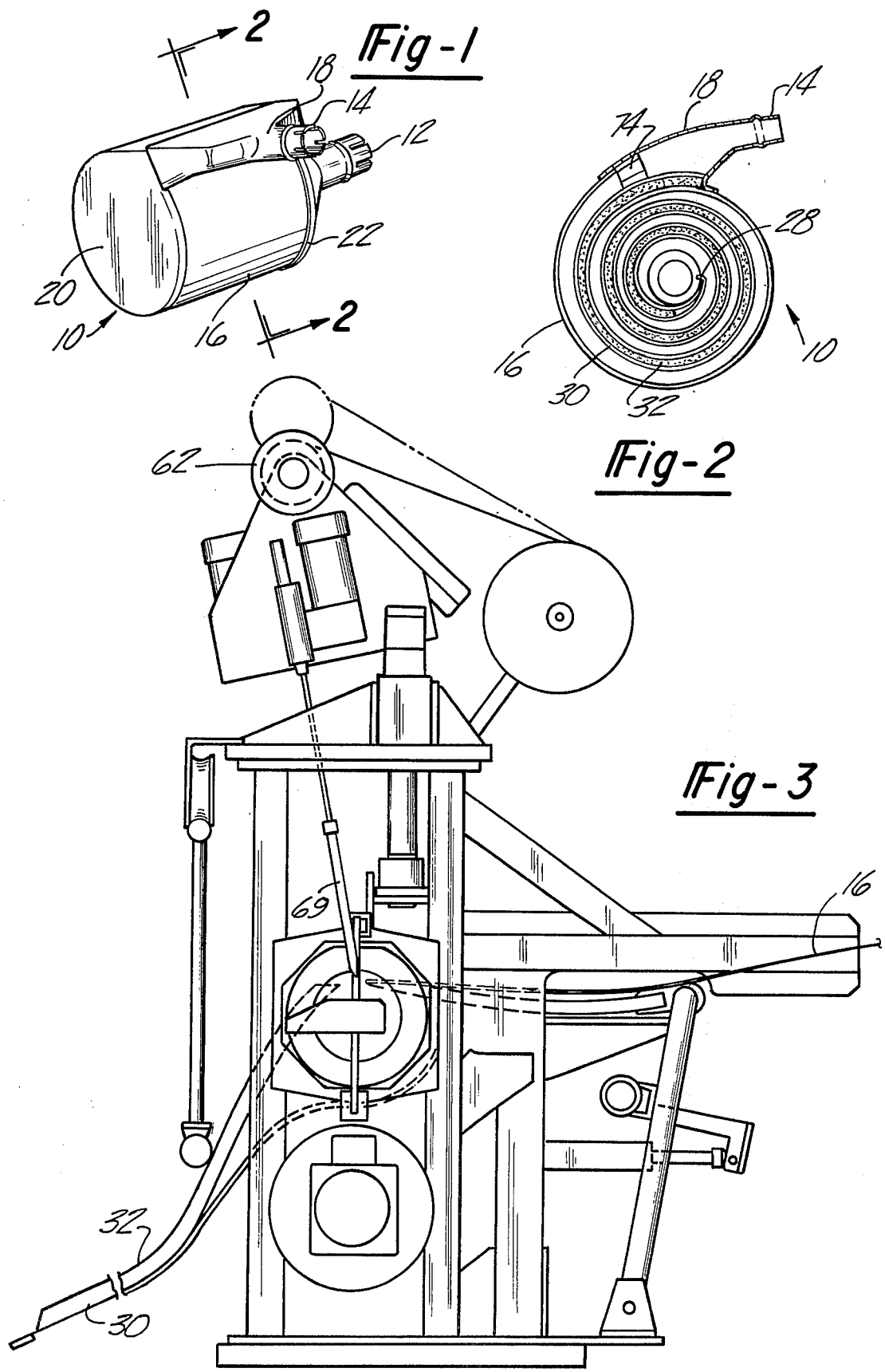

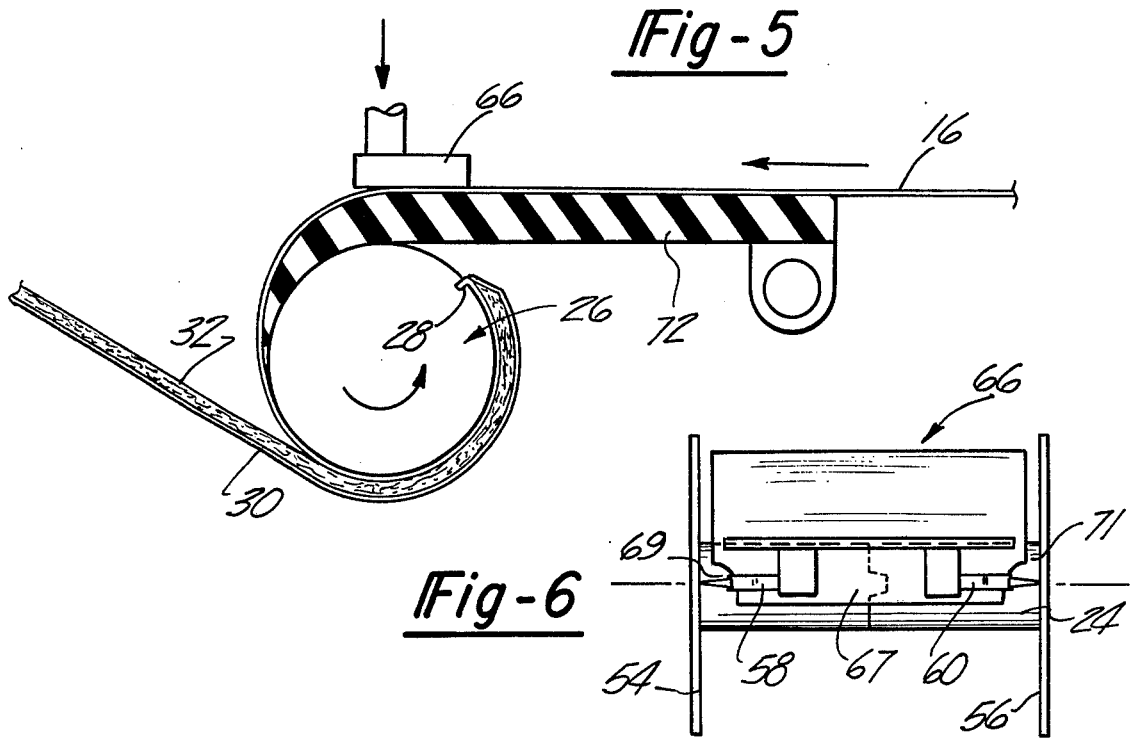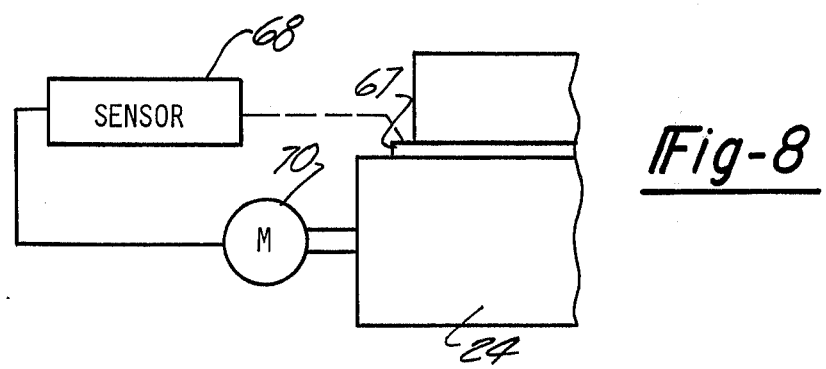

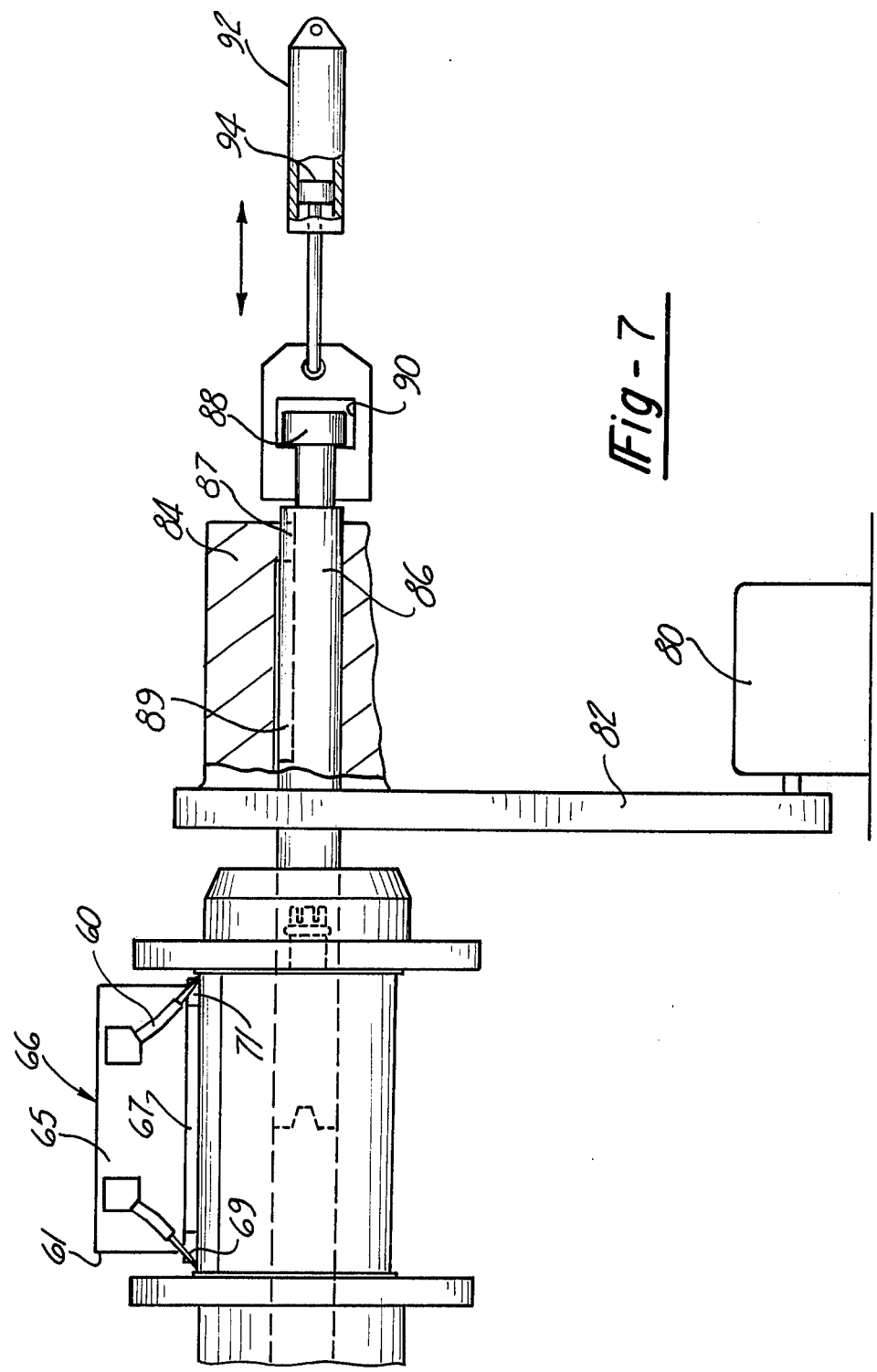

MEANS AND METHODS FOR MAKING A SPIRAL MUFFLER

At the present time, there are many types of silencers or mufflers in use. These mufflers are generally designed to produce sound attenuation in the exhaust system. So-called "spiral mufflers" have been used with some success. These mufflers have generally involved a spiral duct within a housing to provide a relatively long path between the inlet and the outlet pipes. Also, it is known to associate the spiral duct with some sort of absorbing material, such as steel wool, to assist in minimizing noise. One such spiral muffler is described in a Canadian patent 943,417 issued Mar. 12, 1974.

One of the problems involved in spiral mufflers is manufacturing them efficiently. Heretofore, the manufacture of a spiral muffler has involved time consuming hand operations which added greatly to the cost of the overall muffler.

It is an object of this invention to provide improved methods and means for making spiral mufflers.

In accordance with the present invention, means and methods are provided for making a spiral muffler. A rotatable mandrel is disposed to hold a pair of end plates. The end plates are spaced to receive solid and perforated metal strips, with steel wool disposed there between which are secured to the mandrel. A variable speed motor rotates the mandrel to spirally wind the strips with a spacer being provided to maintain a predetermined spaced relationship between the wound portions of the strips as they are wound about the mandrel. As the strips and the steel wool are wound, the longitudinal side edges of the solid metal strip are welded to both of the pair of end discs. A sensing device senses the position of the strips and controls the speed of the motor driving the mandrel to provide a uniform welding operation.

Other objects and advantages of the present invention will be apparent and suggest themselves to those skilled in the art, from a reading of the following specification and claims, taken in conjunction with the accompanying drawings, in which:

FIG. 1 is a perspective view of a spiral muffler, in accordance with the present invention;

FIG. 2 is a cross sectional view taken along lines 2—2 of FIG. 1;

FIG. 3 is a side view of apparatus for manufacturing the spiral muffler illustrated in FIG. 1;

FIG. 5 is a diagrammatical view of illustrating the start of manufacture of the spiral muffler, in accordance with the present invention;

FIG. 6 is a top view illustrating the mandrel between the side plates and welding guns mounted to a movable plate, in accordance with the present invention;

FIG. 7 is a schematic front view of the mandrel, mechanism for driving the mandrel, and associated end plate together with the welding guns on a vertically movable plate illustrating a portion of the manufacturing operation, in accordance with the present invention;

FIG. 8 is a view, partly in block diagram form, illustrating the control means employed during the manufacturing operation, in accordance with the present invention.

Figure 4:
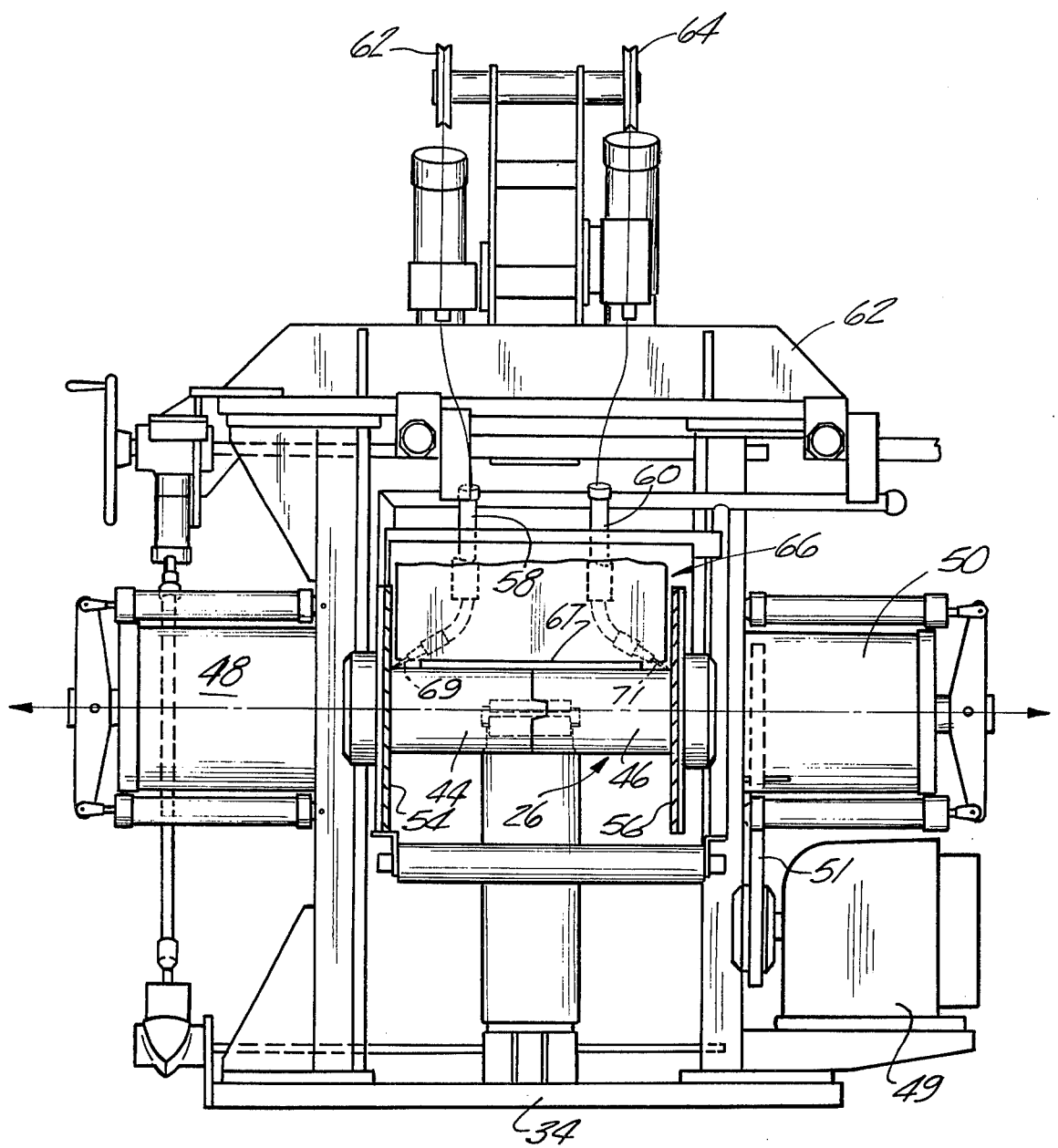
FIG. 4 is a partial front view of the apparatus shown in FIG. 3.

Referring particularly to FIG. 1, a muffler 10 includes an inlet pipe 12 and an outlet pipe 14. The outer housing portion 16, which also comprises the main strip in the spiral muffler, is connected to a guide 18 which leads from the interior of the muffler to the outlet pipe 14. A pair of covers 20 and 22 are provided at the ends of the muffler 10.

Referring to FIG. 2, the interior of the muffler 10 comprises a bent end portion 28 of the strip 16. To the end of the strip 16 and at the bent end portion 28 is secured a second metallic strip 30, which may comprise a perforated strip or screen material, the purpose of which is to hold a strip of sound absorbing material 32. The sound absorbing material 32 may comprise any number of different types of material such as steel wool or the like, is interposed between the strip 16 and perforated strip 30. The basic muffler thus far described is similar in many respects to the muffler described in the aforementioned Canadian patent. The invention, however, is primarily directed to the apparatus and methods for making the muffler illustrated in FIGS. 1 and 2 and not to the muffler per se.

Referring to the remaining figures of the drawing, the machine illustrated automatically winds the strips 16 and 30 illustrated in a spiral manner. At the same time, a sheet of steel wool 32 or similar type material is compressed between the two strips. The space between the windings is precisely controlled by means of a rubber spacer 72. While the strips 16 and 32 are being wound, two welding guns 58 and 60 weld the strip 16 to two end discs 54 and 56 thereby freezing the spiral shape and preventing spring back.

In FIG. 4, the apparatus is shown without the metal strips to be formed. A mandrel 26 comprises a pair of half sections 44 and 46 adapted to be extended pneumatically as illustrated by means of members 48 and 50, respectively or retracted to permit insertion of end plates 54 and 56 having central apertures to fit around the mandrel. After the half sections of the mandrels are extended in the manner illustrated with the end plates 54 and 56 in place, the ends of the strips to be wound are fitted into the slit 26 of the mandrel in a manner as illustrated in FIG. 5. The mandrel is then adapted to be driven by a motor 49 through a chain drive 51.

The first step in the operation of making a mandrel is to withdraw the half sections 44 and 46 and insert a pair of end discs 54 and 56 therein and again extend the half sections of the mandrel in the manner illustrated in FIG. 4. A pair of welding guns 58 and 60 suitably mounted to a table 66 is disposed to weld a metal strip material 16 and to be moved up as the spiraling operation continues, as will be described. The table 66 comprises a vertical portion 65 and a horizontal portion 67. The horizontal portion 67 includes cut away areas 69 and 71 to permit the tips of the welding guns 58 and 60 to extend there through to permit the strip 16 to be welded to the end discs 54 and 56.

As seen in FIGS. 6 and 7, the tips of the welding guns 58 and 60 are in the same vertical plane as the axis of the mandrel 26. Consequently, the welding guns are not sensitive to changes in the radii of curvature as the spiraling operation continues outwardly. This feature is important because it simplifies the rate of speed at which the mandrel must move to assume a uniform welding operation as the welding guns are moved upwardly to weld outer portions of the strip of the muffler as it is being formed.

Welding wires from spools 62 and 64 are fed to the welding guns 58 and 60, respectively. During the welding operation, the pressure plate 66 is movable upwardly as the strip 16 is wound spiralling outwardly away from the mandrel. In order to maintain the welding rate of the strip 16 constant, as the spiral moves outwardly, it is necessary to slow down the rate of the mandrel. This is accomplished by sensing of the position of the table 66 as it is moved upwardly.

A drive motor 80 is connected to a chain drive 82. The drive 82 rotates the spindle 84 which, in turn rotates the mandrel 86.

The spindle 84 includes a key 87 adapted to slide in a slot 89. An operating air cylinder 92 including a piston like element 94 is connected to push or pull the mandrel 86 axially through elements 88 and 90.

The methods and means of sensing the position of the table 66 and controlling the mandrel speed is illustrated in FIG. 8, wherein a sensor 68 detects the level of the table 66. The sensor 68 may comprise a potentiometer (not illustrated) adapted to vary in resistance in accordance with the height of the table 66. The output signal from the sensor 68, which may be an electrical signal is applied to a motor 70, which, in turn, controls the speed of the mandrel 26.

As illustrated in FIG. 5, the beginning of the spiral operation is illustrated where the metal strip 16 is fed from the right and the perforated strip 30 and steel wool 32 is fed from the left. The ends of the strips 16 and 30 are first secured to each other by any suitable means, such as welding, with the bent portion 28 of the strip 16 being inserted into the notch 26 of the mandrel 26. The mandrel 26 is then rotated in a counterclockwise direction. A spacer element 72 is disposed between the mandrel 26 and the table 66, which also acts as a pressure plate against the strip 16. The spacer 72 determines the spacing between the spirally wound portions during operation. After the first revolution, the spacer element 72 rests upon the perforated strip 30. The pressure plate or table 66 rises as the spiraling and welding operations take place to form the windings illustrated in FIG. 2. The spacer 72 provides clearance for proper welding operations and permits the solid metal strip to be welded without interfering with the steel wool.

The strips 16 and 30 with the steel wool 32 therebetween is fed between the end plates about the mandrel. As the winding operation continues, the welding guns 58 and 60 weld the longitudinal edges of the strip 16 to the end plates 54 and 56 (FIG. 4). The welding maintains the strips in the welded fixed positions as the welding operation continues. The mechanical attachment of the inner ends of the strips and steel maintains the strips in a relatively taut condition to prevent unravelling as the operation proceeds.

As the spiralling operation proceeds, the radius of the outer portion of the strip 16 increases. In order to maintain the welding operation along all the welded portions of the strip and end plates, it is necessary to slow down the motor in accordance with the heights of the welding guns.

Referring again to FIGS. 6 and 7, it is noted that the positions of the welding guns 58 and 60 in the same plane as the axis of the mandrel makes it possible to obtain a direct relationship between the rate of rise of the plate 66 and the speed at which the motor should be driving to assume a relatively uniform welding operation.

The end of strip 16 (FIG. 2) includes a portion extending beyond the length of the strip 30 and steel wool 32. An end anchor element 74 is welded or otherwise secured to the extended portion of the strip 16. The anchor element is press fitted between the end of the strip 16 and the next inner surface to maintain the final spacing between the last two layers of strips.

The spacer element 72 (FIG. 2) is used to provide uniform spacing between the windings as the spiralling operation progresses. The spacer element 72 may be pivotally mounted to move upwardly as the spiraling operation takes place.

Upon completion of the winding operation, the guide 18 may be welded or otherwise suitably secured to the completed muffler in a well known manner. Likewise, the inlet and outlet pipes 12 and 14 may be added in a well known manner (FIG. 1).

When the muffler 10 is completed and put in use with a vehicle, exhausted gases from the vehicle are directed into the inlet 12. The path followed by the exhausted gases is relatively long because they must pass between the spirally wound strips before reaching the outlet 14. As the gases proceed through the spiral spaces, noise is attenuated by the steel wool 32. The openings in the perforated sheet 30 permit the exhausted gases to reach the steel wool. The paths of the exhausted gases are numerous, bouncing between adjacent layers of the spiral windings as they proceed to the outlet 14.

What is claimed is:

1. Apparatus for making a muffler comprising a mandrel for holding a pair of end spaced plates, for receiving and spirally winding a plurality of strips of material including a metal strip between said end plates, a variable speed motor for rotating said mandrel to spirally wind said metal strip thereon, means for maintaining a predetermined spaced relationship between the wound portions of said metal strip as it is wound on said mandrel, means for welding said strip to both of said pair of side plates as it is wound on said mandrel, and means for sensing the position of the outermost wound portion of said metal strip to control the speed of said motor to provide a uniform welding operation.

2. Apparatus as set forth in claim 1 wherein said means for welding comprises a pair of welding guns disposed in the same plane as the axis of rotation as said mandrel.

3. Apparatus as set forth in claim 2 wherein said mandrel for receiving said metal strip includes a slit for receiving one end of said metal strip.

4. Apparatus as set forth in claim 3 wherein said plurality of strips further include a sound absorbing strip and a perforated screen, with said sound absorbing strip being disposed between said metal strip and said perforated screen.

5. A method of making a spiral muffler having sound absorbing properties comprising the steps of providing a rotatable mandrel and motor means for driving said mandrel, securing together a solid metal strip, sound absorbing material and a perforated screen to provide a composite strip, with said sound absorbing material being disposed between said solid metal strip and said perforated screen, placing a pair of end plates on said mandrel, attaching one end of said composite strip on to said mandrel between said pair of end plates, rotating said mandrel to spirally wind said composite strip, welding the longitudinal edges of said solid metal strip to said pair of end plates as said mandrel is rotated, maintaining a fixed space between adjacent sections of said composite strip as said composite strip is being wound, and varying the speed of rotation of said mandrel to provide a relatively uniform welding operation as said composite strip is wound outwardly away from the axis of said mandrel.

6. A method as set forth in claim 5 wherein the additional step is provided for maintaining a pair of welding guns in the same plane as the axis of said mandrel during said welding step.

7. Apparatus for making a muffler comprising a mandrel having a pair of end spaced plates for receiving and spirally winding a plurality of strips of material including a metal strip between said end plates, a perforated screen, a sound absorbing strip with said sound absorbing strip being disposed between said metal strip and said perforated screen, said mandrel including a slit for receiving one end of said metal strip, a variable speed motor for rotating said mandrel to spirally wind said metal strip thereon, means for maintaining a predetermined spaced relationship between the wound portions of said metal strip as it is wound on said mandrel, a pair of welding guns disposed in the same plane as the axis of rotation of said mandrel for welding said strip to both of said pair of side plates as it is wound on said mandrel, a pressure plate disposed to rid adjacent the outermost portion of said metal strip, a detector for detecting an electrical signal corresponding to the position of said pressure plate for sensing the position of the outermost wound portion of said metal strip, and means for applying said electrical signal to control the speed of said motor to provide a uniform welding operation.

8. A method of making a spiral muffler having sound absorbing properties comprising the steps of providing a rotatable mandrel and motor means for driving said mandrel, securing together a solid metal strip, sound absorbing material and a perforated screen to provide a composite strip, with said sound absorbing material being disposed between said solid metal strip and said perforated screen, placing a pair of end plates on said mandrel, attaching one end of said composite strip on to said mandrel between said pair of end plates, rotating said mandrel to spirally wind said composite strip, welding with a pair of welding guns the longitudinal edges of said solid metal strip to said pair of end plates as said mandrel is rotated, maintaining a fixed space between adjacent sections of said composite strip as said composite strip is being wound, and varying the speed of rotation of said mandrel to provide a relatively uniform welding operation as said composite strip is wound outwardly away from the axis of said mandrel, maintaining said pair of welding guns in the same plane as the axis of said mandrel during said welding, detecting the position of the outermost portion of said composite strip as it is being wound to produce an output signal corresponding to said position, and utilizing said output signal to vary the speed of rotation of said mandrel.

* * * * *